United States Patent
Turtinen et al.

(10) Patent No.: US 12,048,018 B2
(45) Date of Patent: Jul. 23, 2024

(54) CONTROL MECHANISM FOR RANDOM ACCESS PROCEDURE

(71) Applicant: Nokia Technologies Oy, Espoo (FI)

(72) Inventors: Samuli Heikki Turtinen, Ii (FI); István Zsolt Kovács, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 317 days.

(21) Appl. No.: 17/427,237

(22) PCT Filed: Feb. 1, 2019

(86) PCT No.: PCT/EP2019/052493
§ 371 (c)(1),
(2) Date: Jul. 30, 2021

(87) PCT Pub. No.: WO2020/156678
PCT Pub. Date: Aug. 6, 2020

(65) Prior Publication Data
US 2022/0150972 A1 May 12, 2022

(51) Int. Cl.
*H04W 74/0833* (2024.01)
*H04L 43/0864* (2022.01)
*H04W 74/00* (2009.01)

(52) U.S. Cl.
CPC ..... *H04W 74/0833* (2013.01); *H04L 43/0864* (2013.01); *H04W 74/002* (2013.01)

(58) Field of Classification Search
None
See application file for complete search history.

(56) References Cited

U.S. PATENT DOCUMENTS

2014/0112254 A1  4/2014  Lindoff et al.
2015/0117374 A1  4/2015  Wu
(Continued)

FOREIGN PATENT DOCUMENTS

| JP | 2018-514097 A | 5/2018 |
|---|---|---|
| WO | 2016/047618 A1 | 3/2016 |
| WO | 2016/164100 A1 | 10/2016 |

OTHER PUBLICATIONS

Office action received for corresponding Indian Patent Application No. 202147036140, dated Mar. 2, 2022, 8 pages.
(Continued)

*Primary Examiner* — German Viana Di Prisco
(74) *Attorney, Agent, or Firm* — Lippes Mathias LLP

(57) ABSTRACT

An apparatus for use by a communication network control element or function configured to conduct a communication control for a communication with at least one communication element or function in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to calculate a reception time window in a random access procedure for a communication element or function in at least one communication area controlled by the communication network control element or function, to provide setting information related to a random access procedure to a communication element or function in the at least one communication area, the setting information including an indication of the calculated reception time window and an indication related to a determination of a receiving pattern of the communication element or function in the reception time window, wherein the receiving pattern indicates communication resources being listened by the communication element or function (Continued)

during the reception time window for receiving a response to the random access related signaling, to receive and process a random access related signaling from the communication element or function, to determine, on the basis of a transmission frame in which the random access related signaling is sent by the communication element or function and the calculated reception time window, the receiving pattern of the communication element or function in the reception time window, to transmit, to the communication element or function, the response to the random access related signaling on the basis of the determined receiving pattern so that the response is received in a communication resource listened by the communication element or function.

18 Claims, 6 Drawing Sheets

(56) References Cited

U.S. PATENT DOCUMENTS

| | | | | |
|---|---|---|---|---|
| 2018/0035469 | A1* | 2/2018 | Chen | H04W 74/0833 |
| 2018/0063818 | A1* | 3/2018 | Chen | H04W 24/02 |
| 2020/0107368 | A1* | 4/2020 | Zhou | H04W 72/20 |
| 2020/0413451 | A1* | 12/2020 | Taherzadeh Boroujeni | H04B 7/18504 |
| 2021/0385879 | A1* | 12/2021 | Mahalingam | H04W 56/0045 |

OTHER PUBLICATIONS

Office action received for corresponding Japanese Patent Application No. 2021-544737, dated Jul. 19, 2022, 3 pages of office action and 4 pages of translation available.
"Considerations on Random Access for Non-Terrestrial Networks", 3GPP TSG RAN WG1 Meeting #92, R1-1802632, Agenda: 7.3.2, Interdigital Inc, Feb. 26-Mar. 2, 2018, 4 pages.
"Considerations on random access for NTN", 3GPP TSG RAN WG1 Meeting #93, R1-1806750, Agenda: 7.3.2, Samsung, May 21-25, 2018, 5 pages.
Office action received for corresponding Japanese Patent Application No. 2021-544737, dated Jan. 23, 2023, 3 pages of office action and no page of translation available.
Office action received for corresponding European Patent Application No. 19702900.2, dated Apr. 26, 2022, 19 pages.
"Study on solutions for NR to support non-terrestrial networks (NTN)", 3GPP TSG RAN meeting #82, RP-182880, Agenda: 9.3.1, Thales, Dec. 10-13, 2018, 6 pages.
"3rd Generation Partnership Project; Technical Specification Group Radio Access Network; Solutions for NR to support non-terrestrial networks (NTN) (Release 16)", 3GPP TR 38.821, V0.3.0, Nov. 2018, pp. 1-33.
"3rd Generation Partnership Project; Technical Specification Group Radio Access Network; NR; Physical layer procedures for control (Release 15)", 33GPP TS 38.213, V15.3.0, Sep. 2018, pp. 1-101.
International Search Report and Written Opinion received for corresponding Patent Cooperation Treaty Application No. PCT/EP2019/052493, dated Sep. 23, 2019, 26 pages.
"NR-NTN: Chap 7.3—NR modifications to support the Non-Terrestrial Network", 3GPP TSG RAN1 Meeting #93, R1-1807794, Agenda: 7.3.2, Thales, May 21-25, 2018, 44 pages.
"Impact of 1 ms subframe duration on UP timers", 33GPP TSG-RAN WG2 #98, R2-1704393, Agenda: 10.3, Ericsson, May 15-19, 2017, pp. 1-6.
"NR-NTN: TP for Chap 7.3 NR modifications to support NTN", 3GPP TSG RAN MEETING #80, RP-181394, Agenda: 9.4.1, Thales, Jun. 11-14, 2018, 34 pages.
Office action received for corresponding Japanese Patent Application No. 2021-544737, dated Jul. 3, 2023, 2 pages of office action and 2 pages of Summary available.
Office action received for corresponding Japanese Patent Application No. 2021-544737, dated Nov. 6, 2023, 2 pages of office action and 2 pages of Summary available.
Office action received for corresponding Chinese Patent Application No. 201980094703.6, dated Jan. 26, 2024, 6 pages of office action and no page of translation available.
Office Action received for corresponding Korean Patent Application No. 2021-7028023, dated Apr. 1, 2024, 8 pages of Office Action and 8 pages of summary available.
Office Action received for corresponding European Patent Application No. 19702900.2, dated Apr. 16, 2024, 16 pages.

* cited by examiner

CONTROL MECHANISM FOR RANDOM ACCESS PROCEDURE

RELATED APPLICATION

This application was originally filed as PCT Application No. PCT/EP2019/052493, filed on Feb. 1, 2019 of which is incorporated herein by reference in its entirety.

BACKGROUND

Field

Examples of embodiments relate to apparatuses, methods, systems, computer programs, computer program products and (non-transitory) computer-readable media usable for conducting a control in a random access procedure in a communication network, and in particular to apparatuses, methods, systems, computer programs, computer program products and (non-transitory) computer-readable media usable for optimizing the random access procedure in a communication network environment where long round trip times are to be expected, such as in non-terrestrial network scenarios.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP 3$^{rd}$ Generation Partnership Project
4G fourth generation
5G fifth generation
BS base station
CN core network
CPU central processing unit
DL downlink
eNB evolved node B
ETSI European Telecommunications Standards Institute
FDD frequency division duplex
GEO geostationary
gNB next generation node B
HAPS high altitude platform station
ISL inter satellite link
LEO low earth orbit
LSB least significant bit
LTE Long Term Evolution
LTE-A LTE Advanced
MAC medium access control
MEO medium earth orbit
NG new generation
NR new radio
NTN non-terrestrial network
NW network
OFDM orthogonal frequency division multiplexing
PDCCH physical downlink control channel
PRACH physical random access channel
RA random access
RACH random access channel
RAR random access response
RNTI radio network temporary identifier
RLC radio link control
RRC radio resource control
RTT round trip time
SFN system frame number
TDD time division duplex
UAS unmanned aircraft system
UE user equipment
UL uplink
UMTS universal mobile telecommunication system

SUMMARY

According to an example of an embodiment, there is provided, for example, an apparatus for use by a communication network control element or function configured to conduct a communication control for a communication with at least one communication element or function in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to calculate a reception time window in a random access procedure for a communication element or function in at least one communication area controlled by the communication network control element or function, to provide setting information related to a random access procedure to a communication element or function in the at least one communication area, the setting information including an indication of the calculated reception time window and an indication related to a determination of a receiving pattern of the communication element or function in the reception time window, wherein the receiving pattern indicates communication resources being listened by the communication element or function during the reception time window for receiving a response to the random access related signaling, to receive and process a random access related signaling from the communication element or function, to determine, on the basis of a transmission frame in which the random access related signaling is sent by the communication element or function and the calculated reception time window, the receiving pattern of the communication element or function in the reception time window, to transmit, to the communication element or function, the response to the random access related signaling on the basis of the determined receiving pattern so that the response is received in a communication resource listened by the communication element or function.

Furthermore, according to an example of an embodiment, there is provided, for example, a method for use in a communication network control element or function configured to conduct a communication control for a communication with at least one communication element or function in a communication network, the method comprising calculating a reception time window in a random access procedure for a communication element or function in at least one communication area controlled by the communication network control element or function, providing setting information related to a random access procedure to a communication element or function in the at least one communication area, the setting information including an indication of the calculated reception time window and an indication related to a determination of a receiving pattern of the communication element or function in the reception time window, wherein the receiving pattern indicates communication resources to be listened during the reception time window for receiving a response to the random access related signaling, receiving and processing a random access related signaling from the communication element or function, determining, on the basis of a transmission frame in which the random access related signaling is sent by the communication element or function and the calculated reception time window, the receiving pattern of the communication element or function in the reception time window, transmitting, to the communication element or function, the response to the random access related signaling on the basis of the determined receiving pattern so that the response is received in a communication resource listened by the communication element or function.

According to further refinements, these examples may include one or more of the following features:

- the reception time window may be calculated on the basis of a minimum round trip time and a maximum round trip time of a signaling of a communication on a communication path between the at least one communication element and function and the communication network control element or function in the at least one communication area controlled by the communication network control element or function, wherein the reception time window is even to or greater than a difference between the maximum round trip time and the minimum round trip time;
- the reception time window may be larger than one transmission frame in which a temporary identifier for the random access procedure is calculated;
- with the setting information related to the random access procedure, an indication defining a time offset between a point of time when the random access related signaling is sent from the communication element or function to a start of the reception time window may be provided;
- with the setting information related to the random access procedure, data indicating a setting of the receiving pattern of the communication element or function may be provided;
- as the random access related signaling from the communication element or function, one of a random access preamble and a radio resource control connection request may be received and processed, wherein the reception time window sets the timing for the random access response window or the random access contention resolution timer in the at least one communication element or function;
- as the receiving pattern of the communication element or function in the reception time window, an interval between communication resources being listened by the communication element or function for receiving and decoding the response to the random access related signaling may be determined, wherein the receiving pattern includes between communication resources being listened communication resources in which the communication element or function does not decode the response to the random access related signaling;
- the interval between the communication resources being listened by the communication element or function for receiving and decoding the response to the random access related signaling may be set on the basis of the length of the reception time window;
- the transmission frame may be identified by using a system frame number, wherein a location of communication resources being listened by the communication element or function according to the receiving pattern is determined on the basis of the system frame number in which the random access related signaling is transmitted by the communication element or function;
- the communication resources of the receiving pattern may define one of time slots and frequency portions;
- the communication network may be a non-terrestrial network, and the communication network control element or functions may act as a base station in the non-terrestrial network.

According to an example of an embodiment, there is provided, for example, an apparatus for use by a communication element or function configured to conduct a communication with a communication network control element or function controlling a communication in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to receive and process setting information related to a random access procedure from the communication network control element or function, the setting information including an indication of a reception time window in the random access procedure and an indication related to a determination of a receiving pattern of the communication element or function in the reception time window, wherein the receiving pattern indicates communication resources being listened by the communication element or function during the reception time window for receiving a response to the random access related signaling, to send a random access related signaling to the communication network control element or function, to start the reception time window according to the setting information, to determine, on the basis of a transmission frame in which the random access related signaling is sent and the reception time window, the receiving pattern in the reception time window, to decode, during the reception time window, signals received in the communication resources determined in the receiving pattern for receiving the response to the random access related signaling.

Furthermore, according to an example of an embodiment, there is provided, for example, a method for use in a communication element or function configured to conduct a communication with a communication network control element or function controlling a communication in a communication network, the method comprising receiving and processing setting information related to a random access procedure from the communication network control element or function, the setting information including an indication of a reception time window in the random access procedure and an indication related to a determination of a receiving pattern of the communication element or function in the reception time window, wherein the receiving pattern indicates communication resources being to be listened during the reception time window for receiving a response to the random access related signaling, sending a random access related signaling to the communication network control element or function, starting the reception time window according to the setting information, determining, on the basis of a transmission frame in which the random access related signaling is sent and the reception time window, the receiving pattern in the reception time window, decoding, during the reception time window, signals received in the communication resources determined in the receiving pattern for receiving the response to the random access related signaling.

According to further refinements, these examples may include one or more of the following features:

- the reception time window may be based on a minimum round trip time and a maximum round trip time of a signaling of a communication on a communication path between the communication element and function and the communication network control element or function, wherein the reception time window is even to or greater than a difference between the maximum round trip time and the minimum round trip time;
- the reception time window may be larger than one transmission frame in which a temporary identifier for the random access procedure is calculated;
- with the setting information related to the random access procedure, an indication defining a time offset between a point of time when the random access related signaling is sent to the start of the reception time window may be received and processed, and the time offset before starting the reception time window after sending the random access related signaling may be considered;
- with the setting information related to the random access procedure, data indicating a setting of the receiving pattern may be received and processed, and the receiving pattern may be determined on the basis of the received data;
- as the random access related signaling from the communication element or function, one of a random access preamble and a radio resource control connection request may be sent, wherein the reception time window sets the timing for the random access response window or the random access contention resolution timer in the at least one communication element or function;
- as the receiving pattern of the communication element or function in the reception time window, an interval between communication resources being listened for receiving and decoding the response to the random access related signaling may be determined, wherein the receiving pattern includes between communication resources being listened communication resources in which the response to the random access related signaling is not decoded;
- the interval between the communication resources being listened by the communication element or function for receiving and decoding the response to the random access related signaling may be set on the basis of the length of the reception time window;
- the transmission frame may be identified by using a system frame number, wherein a location of communication resources being listened according to the receiving pattern is determined on the basis of the system frame number in which the random access related signaling is sent;
- the communication resources of the receiving pattern may define one of time slots and frequency portions;
- the communication network may be a non-terrestrial network, and the communication network control element or functions may act as a base station in the non-terrestrial network.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
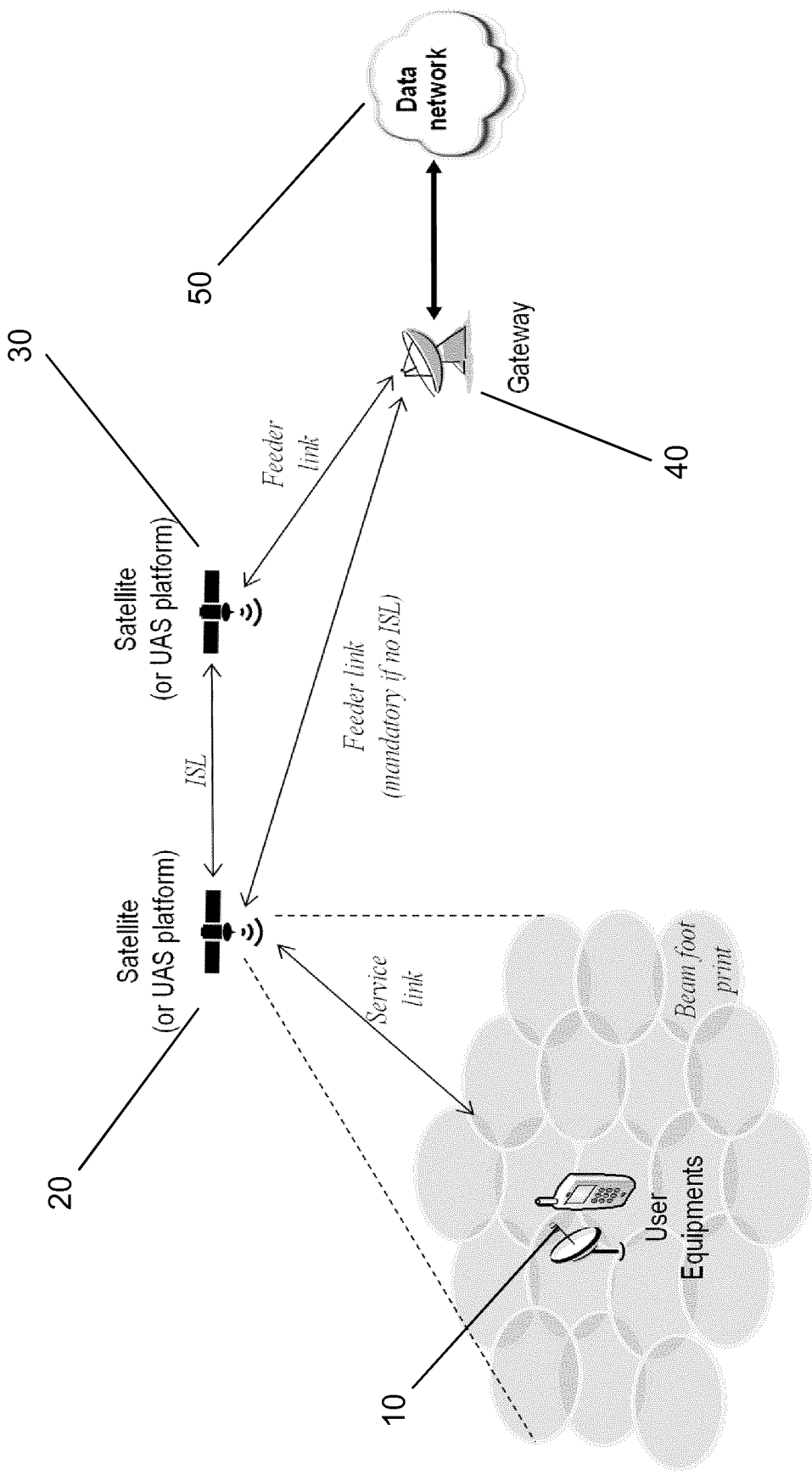
FIG. 1 shows a diagram illustrating an example of a communication network environment in which examples of embodiments are implementable.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Basically, for properly establishing and handling a communication between two or more end points (e.g. communication stations or elements, such as terminal devices, user equipments (UEs), or other communication network elements, a database, a server, host etc.), one or more network elements or functions (e.g. virtualized network functions), such as communication network control elements or functions, for example access network elements like access points, radio base stations, relay stations, eNBs, gNBs etc., and core network elements or functions, for example control nodes, support nodes, service nodes, gateways, user plane functions, access and mobility functions etc., may be involved, which may belong to one communication network system or different communication network systems.

Non-terrestrial networks (NTN) allow to extend and complement terrestrial networks in unserved or underserved areas, for example. NTN is advantageous, for example, in terms of wide area service coverage and significantly reduced vulnerability to physical attacks or natural disasters for future communication services. Recent developments in communication networks intend to use this aspect, which is reflected, for example, by recent commercial and standardisation endeavours. For example, 3GPP recently initiated a study item for New Radio-based, i.e., 5G, NTN usage, wherein satellite systems or other aerial based platforms are intended to be used either as a stand-alone solution or as an integration to terrestrial networks in mobile broadband and machine-type communication scenarios.

Basically, NTN refer to networks, or segments of networks, using an airborne or spaceborne vehicle for transmission. Spaceborne vehicles include, for example, satellites such as LEO satellites, MEO satellites, GEO satellites and the like. In the following table 1, an overview of satellite based NTN platforms is provided.

service area bounded by the radiation pattern of the on board antenna system. Beam foot prints of the satellite beams are typically of elliptic shape. The coverage area of a satellite or UAS platform depends on the on board antenna diagram and minimum elevation angle above the horizon. It is to be noted that a transparent payload refers to radio frequency filtering, frequency conversion and amplification. Hence, the waveform signal repeated by the payload is un-changed. On the other hand, a regenerative payload considers radio frequency filtering, frequency conversion and amplification as well as demodulation/decoding, switch and/or routing, coding/modulation, which is effectively equivalent to having all or part of base station functions (e.g. gNB) on board of a satellite or UAS platform. Optionally, inter-satellite links (ISL) are provided in case of a constellation of satellites; it is to be noted that ISL requires regenerative payloads on board the satellites.

In general, NTN configurations can be categorized, for example, on the basis of the type of satellite payload, i.e., transparent or regenerative, or the type of user access link, i.e., direct or through a relay node located on the ground. Regarding the link between the user and the network, one or more airborne or spaceborne stations may be required. For

TABLE 1

Types of NTN platforms

| Platforms | Altitude range | Orbit | Typical beam footprint size |
|---|---|---|---|
| Low-Earth Orbit (LEO) satellite | 300-1500 km | Circular around the earth | 100-500 km |
| Medium-Earth Orbit (MEO) satellite | 7000-25000 km | | 100-500 km |
| Geostationary Earth Orbit (GEO) satellite | 35 786 km | notional station keeping position fixed in terms of elevation/azimuth with respect to a given earth point | 200-1000 km |
| UAS platform (including HAPS) | 8-50 km (20 km for HAPS) | | 5-200 km |
| High Elliptical Orbit (HEO) satellite | 400-50000 km | Elliptical around the earth | 200-1000 km |

Airborne vehicles include e.g. HAPS including for example UAS, e.g. Lighter than Air UAS (LTA), Heavier than Air UAS (HTA), and the like, which usually operate in altitudes typically between 8 and 50 km, quasi-stationary.

That is, NTN features comprise the following elements. One or several satellite gateways are provided that connect the NTN Network to a public data network, wherein one or more satellites, such as GEO satellites fed by one or several satellite gateways which are deployed across the satellite targeted coverage (e.g. regional or even continental coverage), and/or one or more non-GEO satellites (e.g. LEO satellite) served successively by one satellite gateway at a time are present, wherein the system ensures service and feeder link continuity between the successive serving satellite gateways with sufficient time duration to proceed with mobility anchoring and hand-over. A further element is a so-called feeder link (i.e. radio link) between a satellite gateway and the satellite or UAS platform, and a service link (radio link) between the UE and the satellite or UAS platform. Further elements are satellites or UAS platforms which may implement either a transparent or a regenerative (i.e. with on board processing) payload. The satellite or UAS platform typically generates several beams over a given example, depending on a satellite altitude, there could be one or more satellites required for providing on-ground communication services.

FIG. 1 shows a diagram illustrating an example of a NTN communication scenario in which examples of embodiments are implementable. Specifically, in FIG. 1, a UE 10 is located in a communication area of an NTN (it is to be noted that besides the UE 10 a relay node is shown which can be used for connecting the UE to the satellite, but in the following a direct link of the UE 10 is assumed). The communication area is indicated by means of a plurality of beam foot prints representing the respective coverage area of a satellite or UAS 20. The UE 10 is served by satellite or UAS platform 20 within the targeted service area.

Reference sign 30 denotes another satellite or UAS platform which is connected to the satellite or UAS 20 via ISL.

Reference sign 40 denotes a (satellite or UAS) gateway. The gateway 40 provides the connection to a data network 50, such as the Internet, a core network structure or the like.

As described above, a service link is established between the UE 10 and the serving satellite or UAS platform 20. On the other hand, the gateway 40 is connected to the satellite or UAS platform system by a feeder link, wherein an ISL is interconnected between the serving satellite or UAS platform 20 and a relaying satellite or UAS platform 30.

Furthermore, as indicated above, the function of a communication network control element or function, such as of a gNB which controls the access of the UE 10 to the network, may reside in different locations in the NTN. One possibility is, in the case of a regenerative payload scenario, that the gNB function is located in the satellite or UAS platform 20 or 30. Another possibility is, in the case of a transparent payload scenario, that the gNB function is located at the gateway 40 side, so that the satellite or UAS platform functions only as a relay. However, in the latter case, the influences caused by the satellite or UAS platform configuration, such as transmission delay, channel impairments and the like, are more severe.

For the implantation of an NTN structure in a communication network configuration, such as a NR or 5G network, several considerations have to be made. For example, with regard to Layer 2 and above, and RAN architecture, propagation delay is to be considered. In this context, timing requirements and solutions on layer 2 aspects, MAC, RLC, RRC, to support non-terrestrial network propagation delays considering FDD and TDD duplexing mode are studied. This includes radio link management.

In the following, different scenarios for NTN employment are considered, as indicated in Table 2.

TABLE 2

Reference scenarios

|  | Transparent satellite | Regenerative satellite |
|---|---|---|
| GEO based non-terrestrial access network | Scenario A | Scenario B |
| LEO based non-terrestrial access network: steerable beams | Scenario C1 | Scenario D1 |
| LEO based non-terrestrial access network: the beams move with the satellite | Scenario C2 | Scenario D2 |

When studying the NTN configuration as depicted in FIG. 1, it is obvious that due to the larger distances between the involved elements, propagation delay between the e.g. the UE 10 and the satellite or UAS platform (and the gateway) (i.e. the NTN node) is one of the main issues at least from the L2 point of view. In the following table 3, this is further illustrated for the above indicated reference scenarios, wherein an important factor for the further considerations is related to RTT parameters

TABLE 3 parameters for reference scenarios

| | NTN scenarios | | | |
|---|---|---|---|---|
| | A GEO transparent payload | B GEO regenerative payload | C1 C2 LEO transparent payload | D1 D2 LEO regenerative payload |
| Satellite altitude | 35 786 km | | 600 km | |
| Relative speed of Satellite wrt earth | negligible | | 7.56 km per second | |

TABLE 3-continued parameters for reference scenarios

| | NTN scenarios | | | |
|---|---|---|---|---|
| | A GEO transparent payload | B GEO regenerative payload | C1 C2 LEO transparent payload | D1 D2 LEO regenerative payload |
| Min elevation for both feeder and service links | 10° for service link and 5° for feeder | | | |
| Typical Min/Max NTN beam foot print diameter (note 1) | 100 km/1000 km | | 50 km/500 km | |
| Maximum Round Trip Delay on the radio interface between the gNB and the UE | 541.75 ms (Worst case) | 270.57 ms | 28.41 ms | 12.88 ms |
| Minimum Round Trip Delay on the radio interface between the gNB and the UE | 477.14 ms | 238.57 ms | 8 ms | 4 ms |
| Maximum Delay variation as seen by the UE | Negligible | | Up to +/−40 ps/sec (Worst case) | Up to +/−20 ps/sec |

As can be seen above, by the usage of NTN in connection with NR, several issues are to be considered. In particular, the parameters related to the RTT are of relevance. For example, while for GEO satellites the propagation delay and hence the RTT may be quite static within a cell, with LEO satellites, especially, as they are moving fast, the elevation angle between the UE and satellite may change rapidly and hence the RTT varies within the cell. Furthermore, the difference between the minimum RTT and the maximum RTT which is to be considered is larger than that of a terrestrial communication deployment; in case of LEO satellites, the difference may be e.g. 30 ms, while in case of GEO satellites, the difference may be more than 60 ms. As indicated above, in case of LEO satellites, this RTT difference may vary rapidly. While the variation in the difference for GEO satellites is quite static (at least for certain UE position), the UE position in the network (i.e. the coverage area as shown in FIG. 1) is not known before a signaling is received by the network. For deployments with a bent-pipe operation mode (e.g. in case of a transparent payload scenario where relay satellite 30 is included), the situation is more complex since the RTT is doubled compared to the regenerative (on-board gNB) operation mode.

In view of the above, impacts of the introduction of NTN aspects in communication networks such as 5G or 5G NR networks are to be considered, in particular with regard to Level 2 timers.

In particular, one field to be considered is the random access (RA) procedure. The RA procedure concerns, for example, an initial access from RRC_IDLE state, an RRC connection re-establishment procedure, a handover, DL or UL data arrival during RRC_CONNECTED when UL synchronisation status is "non-synchronised", a transition from RRC_INACTIVE state, a beam failure recovery etc.

The RA procedure between a UE and the network (i.e. the serving gNB, for example) can be contention-based (e.g. when the UE is not yet synchronized or lost its synchronization), or contention-free (e.g. in case the UE was previously synchronized to another gNB). Both cases involve the transmission of a RA preamble from the UE to the gNB. The RA preamble is to be sent at specific time-frequency resources that are indicated by the gNB on the control channels by means of configuration information (e.g. broadcasted in the coverage areas of the respective gNBs).

In a the contention-based procedure (a contention-free case just requires the preamble transmission and the reception of the response thereto, on the UE side), in a first step, the NR UE randomly chooses a preamble from a predefined set, also based on preliminary information on the expected amount of resources to be used in a subsequent (if any) step, and sends the preamble to the gNB, along with a temporary network identifier, which is computed based on the RA preamble as well or based at least on the RACH occasion where the RA preamble is transmitted (referred to as RA-RNTI). According to current standards, the corresponding ra-ResponseWindow is started immediately after preamble transmission.

Then, the gNB responds to the request with a RA Response (RAR) message, which shall be received by the UE within a RA time window (RA-responseWindow) between starting after the transmission of the last preamble symbol. In a terrestrial based network, this time window is usually in a range of several ms to 10 ms. In case the time window expires, the UE may attempt a new RA procedure. Otherwise, in case the RAR is received, in a next steps, the NR UE sends a scheduled transmission (referred to as Msg3 in an RA procedure), such as a RRC connection request, and is assigned a final network identifier. Due to the contention based RA procedure, the network checks for a possible contention case (i.e. another UE has sent the same preamble and decodes for network response with the same RA-RNTI). If this is not the case, i.e. no contention is detected, contention resolution is indicated in a signaling to the UE (referred to as Msg4 in an RA procedure). For this, the UE has started a contention resolution timer; when no contention resolution signaling is received from the network before this timer expires, contention is assumed, and the RA procedure is restarted. In case the UE receives a correct response, the RA procedure is deemed to be successful so that the UE is linked to the network.

However, the situation in a network where the RTT is large, as is the case for the NTN scenario described above, is more complex.

As described above, after transmitting the RA preamble (Msg1), the UE monitors, for example, the PDCCH for the RAR message (Msg2). The response window (ra-ResponseWindow) starts at a determined time interval after the preamble transmission. If no valid response is received during the ra-ResponseWindow, a new preamble is sent. If a certain number of preambles have been sent, an appropriate random access problem will be indicated to upper layers.

In terrestrial communications, the RAR is expected to be received by the UE within a few milliseconds. In NTN the propagation delay is much larger and therefore, the RAR cannot be reached at the UE within the specified time interval. Therefore, it is proposed to delay the start of the ra-ResponseWindow should for NTN, mainly in order to save UE power. Hence, the consideration of an offset for the start of the ra-ResponseWindow for NTN is suggested.

Moreover, when the UE sends an RRC Connection Request (Msg3), it will monitor for Msg4 in order to resolve a possible RA access contention. The ra-ContentionResolutionTimer starts after the Msg3 transmission. The maximum configurable value of ra-ContentionResolutionTimer is larger, but at least some of the above described scenarios may lead to a delay due to RTT. In order to save UE power, it is proposed to delay the start of the ra-ContentionResolutionTimer for NTN. Hence, it is also suggested to introduce an offset for the start of the ra-ContentionResolutionTimer for NTN.

As indicated above, the ra-ResponseWindow length is rather short and may vary from one slot length (which length depends on subcarrier spacing) up to 10 ms (regardless of the subcarrier spacing) in NR. On the other hand, the ra-ContentionResolutionTimer length may vary from 8 ms to 64 ms, for example.

However, even if delaying the start of the usual reception time window (e.g. the ra-ResponseWindow) to cope with the increased RTT is proposed, there still remains the issue caused by the long round trip times. For example, in case of the highly mobile LEO satellites, the elevation angle of the satellite compared to the UE determines the observable RTT. That is, for example, the difference between the minimum and maximum RTT of LEO scenario C1 as indicated above is more than 20 ms. On the other hand, the ra-ResponseWindow maximum size is 10 ms, as indicated above. The proposed offset should be set such that the ra-ResponseWindow considers the minimum RTT, i.e. it should start close to the minimum possible RTT value, so as to have some time slots to send the actual RAR for a UE that has the minimum RTT. However, this is obviously not enough time for UEs having where the RTT is the maximum RTT value. This is because before the UL timing has been acquired through RA procedure, the UL transmissions may be decoded in satellite receiver between the min and max propagation delay in the cell.

Considering, as an example, a case where of an NTN UE LEO satellite connectivity. Referring to FIG. 1, for UE 10, a specific satellite e.g. satellite 10 is visible, i.e. visible above a certain elevation angle, for a time duration of 5 to 6 minutes. It is to be noted that even in this relatively short 'pass-over' period, the propagation delay can change by couple of milliseconds in the best case (e.g. from 2.3 ms to 4 ms for a LEO satellite at 600 km altitude and an UE close to the equator). Furthermore, for the same UE, the experienced propagation delay is decreasing in the beginning of the 'pass-over' period and then increasing again towards the end of the 'pass-over' period. Therefore, consecutive random-access attempts during the 'pass-over' period from a UE to the same LEO satellite will happen with different propagation delays.

A similar problem occurs e.g. in case of a GEO satellite, where the variation in the RTT is more static, but the difference between minimum and maximum RTT is even greater.

It could be contemplated to increase the time of the reception window. For example, the raResponseWindow could be increased to, e.g., 30 ms or 70 ms, depending on the type of satellite (LEO or GEO).

However, in the 30 ms case (LEO satellite), this would require three times more RA-RNTI space in a worst case scenario. The reason is as follows.

In NR communication networks, the temporary identifier used in the RA procedure (the RA-RNTI) is calculated by the UE with the following formula. That is, the RA-RNTI associated with a PRACH occasion in which the RA Preamble is transmitted, is computed as:

$$RA\text{-}RNTI=1+s\_id+14 \times t\_id+14 \times 80 \times f\_id+14 \times 80 \times 8 \times ul\_carrier\_id$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for RA Preamble transmission (0 for NUL carrier, and 1 for SUL carrier). In this context, the parameters s_id and t_id specify the RA-RNTI to be unique within one system/radio frame. However, whenever in the next system frame the same symbol/slot/frequency resource is allocated for PRACH, the same RA-RNTI would be calculated, e.g. by another UE.

The above indicated formula is valid for the radio frame of 10 ms duration. However, in case a time period above 10 ms is required, it would be necessary to extend the above formula, in order to guarantee a unique value for the RA-RNTI.

That is, when considering only the 30 ms time window, about 53760 RNTI values would be required solely for RAR. However, there is only a space of 64k RNTI values available (16 bit value defining RNTI space which is also used for allocating UEs C-RNTI, TC-RNTI, CS-RNTI etc.). Hence, alone from the required RNTI space, such an approach is not optimal.

Furthermore, when the 30 ms (or even larger) reception window is monitored by the UE, this would means to unnecessarily drain the UE's battery, e.g. in case it is required to decode the PDCCH for RAR unnecessary long.

Consequently, a solution is required which allows to keep the RNTI space as in the legacy system.

In the following, different exemplifying embodiments will be described using, as an example of a communication network to which examples of embodiments may be applied, a communication network architecture based on 3GPP standards for a communication network, such as a 5G/NR, using NTN parts, without restricting the embodiments to such an architecture, however. It is obvious for a person skilled in the art that the embodiments may also be applied to other kinds of communication networks where an extended RTT is to be expected and which have suitable means by adjusting parameters and procedures appropriately, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the invention can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station (BS), an gNB (ground based or airborne/spaceborne), a radio network controller, a core network control element or function, such as a gateway element, or other network elements or functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

According to embodiments of the invention, a new RA control scheme is proposed in which a reception time window for receiving a response to a RA related signaling, such as the RA preamble (Msg 1 indicated above), i.e. the ra-ResponseWindow, for example, is at least as long as the difference between minimum RTT and the maximum RTT in a transmission path having e.g. a long delay, as in case of an NTN scenario as shown in FIG. 1. In the following, an example will be described where a LEO satellite is assumed to communicate with the UE and where a difference between minimum and maximum RTTs is about 30 ms (e.g. in a LEO scenario according to above described scenario D1/D2, where a satellite orbit is at 1200 km to 1500 km). However, it is evident for the person skilled in the art that the same principles are applicable in other NTN scenarios as described above, i.e. for scenarios with other satellite deployments, for transparent or regenerative payload, for other satellite orbits (or UAS altitudes) etc. (for example, a regenerative LEO scenario with more than 10 ms difference between the minimum and maximum RTT occurs in cases of an orbit at 1200 km or 1500 km).

According to examples of embodiments, a network configurable (e.g. cell specific or UE specific) time domain listening pattern (also referred to as receiving patter) is defined for a reception time window in which a response to an RA related signaling is tried to be received by the UE (e.g. for a ra-ResponseWindow of e.g. 30 ms as discussed above for receiving the RAR).

The receiving pattern is configured such that the UE does not continuously decode the incoming signaling (e.g. PDCCH) for the RA-RNTI used in the RA preamble. Instead, the UE uses a NW configured or predefined set of resources (e.g. time slots) that expand over the whole ra-ResponseWindow (of e.g. 30 ms).

For example, the NW configures the duration of the reception time window (e.g. the ra-ResponseWindow) such that it accounts the difference between the minimum and maximum RTTs of the cell. This value can be calculated for each cell defined e.g. by a satellite.

It is to be noted that also an offset can be considered, which depends e.g. from the minimum RTT. That is, the start of the reception time window can be further postponed according to the offset.

The reception time window is signaled by the NW (e.g. broadcasted) in the coverage area (cell) to be considered, so that every UE being located therein is able to get this information. For example, a corresponding indication is sent in connection with RACH configuration information. It is to be noted that optionally also information regarding the receiving pattern to be used may be sent in this manner, but as described below this is not mandatory (i.e. the UE can determine the receiving pattern by using the length of the reception time window).

The UE derives the RA-RNTI to be used over the ra-ResponseWindow as usual, i.e. on the basis of the existing RA-RNTI formula discussed above, for example. However, in order to avoid that a conflict with another UE occurs (which may use the same RA-RNTI, as discussed above), the above mentioned receiving pattern is used. In the receiving pattern, a time domain offset in terms of slots is considered, for example, beginning from the start of the ra-Response Window, for listening only to certain slots, while the signaling in other slots is ignored. For example, an interval of every third slot can be defined to be listened in the case of the 30 ms reception time window. As an example, the slot offset is such that, for instance, every $3^{rd}$ slot is listened (i.e., for example, slots 0, 3, 6, . . . ; or slots 1, 4, 7, . . . ; or slots 2, 5, 8, . . . ). It is to be noted that the interval of slots is variable and can be based, for example, on the number of radio frames/SFNs covered by the reception time window. For example, when considering the 30 ms RAresponse window, which means that three SFNs are covered, the interval may be three. In other case, such as a GEO satellite based case with a difference in the minimum and maximum RTTs of 60 ms, the reception time window may be correspondingly 60 ms, and the interval may be such that every sixth slot is listened.

The actually used listening pattern is based, for example, on the radio frame used for transmitting the RA related signaling. For example, the SFN of the radio frame in which the RA preamble is sent to the NW is used to define which slots are to be listened (e.g. the slots 0, 3, 6). That means also that the RNTI space can be used as in a conventional network scenario without NTN, and the RA-RNTI can be calculated as currently in NR.

As a method of mapping the SFN to the slots to be listened, for example, an algorithm is usable that it is configured that every #X slot is to be listened and the slot numbers to be listened are calculated based on the SFN in such a manner every slot is listened which satisfies [slot number] mod #X=SFN mod #X. Alternatively or additionally, for example, the network may provide single or multiple so-called SearchSpace configurations as well as different monitoringSlotPeriodicityAndOffset indications which define the periodicity in the number of slots for a SearchSpace and an offset number to determine the listening pattern for each specific SFN. According to one example of an embodiments, the slot periodicity is same for each SearchSpace but the offset is determined based on the SFN; for example, the LSB(s) (Least Significant Bits) of the SFN can be used to determine the offset for each dedicated SearchSpace to come up with the listening pattern.

As indicated above, the receiving pattern could be configurable by the NW along with the RACH configuration information (e.g. as an indication that every #X slot is to be listened) or derived by the UE based on the length of the reception time window (e.g. the 30 ms ra-ResponseWindow) and the RACH configuration.

When the UE sends the RA related signaling (e.g. the RA preamble), it starts the ra-ResponseWindow as configured (e.g. with or without offset). Then, it starts to decode the PDCCH for the RA-RNTI based on the configured receiving pattern (e.g. in the determined slot interval). Since the SFN in which the preamble is sent is known by the UE, while the NW (the gNB) broadcasts the SFN to the UE and knows in which SFN the preamble was received, both entities are aware of the slots in which the UE listens for the response (e.g. the RAR).

It is to be noted that the RA procedure described above can be similarly applied for contention based as well as contention free RA. For example, in a contention free RA scenario, the NW is able to configure the UE with an individual receiving pattern. On the other hand, in a contention based scenario, in case there are more than one UE using the same RA-RNTI in the same SFN, the contention resolution mechanism is still usable. That is, if the same RA-RNTI is calculated/used by e.g. two UEs (which is still possible as the conventional RA formula is used), but the RA preamble is sent in different frames (i.e. at different SFNs), the consideration of the SFN allows to allocate the RAR to the correct UE, as the different SFN allows a unique identification (due to multiplexing in different slots). On the other hand, in case the two UEs have used and sent the preamble in same RACH and hence in the same SFN they collide only if the preamble is also the same (there can be up to 64 preambles in one RACH), wherein in case the contention resolution solves which one of the UEs is served (if the NW was able to receive the Msg3 from one of the UEs).

According to further examples of embodiments, it is possible to consider varying transmission delays. Usually, the RACH and preamble design is such that the NW can determine the UL timing (and hence the RTT) very precisely so that one slot offers enough space for a safe reception. However, if due to any conditions such an accurate timing is not possible, the receiving pattern can be adapted such that, for example, three consecutive slots are used for listening, followed by e.g. six slots being ignored, and so on.

Furthermore, according to examples of embodiments, while the above description is related mainly to the RA preamble and RAR case (i.e. reception time window is the RAresponse window), it is also possible to apply a reception time window in connection with a receiving pattern to the ra-ContentionResolutionTimer. For example, such an approach allows the NW to use the same temporary C-RNTI with which to respond to UEs during ra-ContentionResolutionTimer with the time domain listening pattern.

Furthermore, it is to be noted that according to some examples of embodiments, the resources considered for the receiving pattern are not limited to time domain resources (i.e. time slots in the radio frame). Alternatively or additionally, the resources are frequency resources. For example, multiplexing can be done in the frequency domain. That is, based on the PRACH/RA occasion in which e.g. the RA preamble is transmitted, the UE listens for the response (RAR) in predefined frequency resources. This allows responding with the same RA-RNTI to different requests in frequency domain. In this case, the UE needs to listen continuously. Moreover, alternatively or additionally, resources are categorized by means of beams, such as NR beams, such as in a multiple beam configuration as indicated in FIG. 1, where each beam is configured with its own PRACH resources (see e.g. NR Release 15). In this connection, it is to be noted that due to a satellite movement (especially in case of LEO satellites), the same UE may see/detect several beams consecutively. Therefore, the receiving pattern may be configured such that it is valid also across different beams. According to further examples of embodiments, the receiving pattern can also be configured such that a beam-hopping pattern and/or sequence pattern is defined. It is to be noted that the actual configuration of the receiving pattern considering beam related parameters depends on how the beams are deployed in the respective coverage area (e.g. with regard to orientation, size etc.). Also the actual location of the UE and the change thereof is to be considered.

Figure 2:
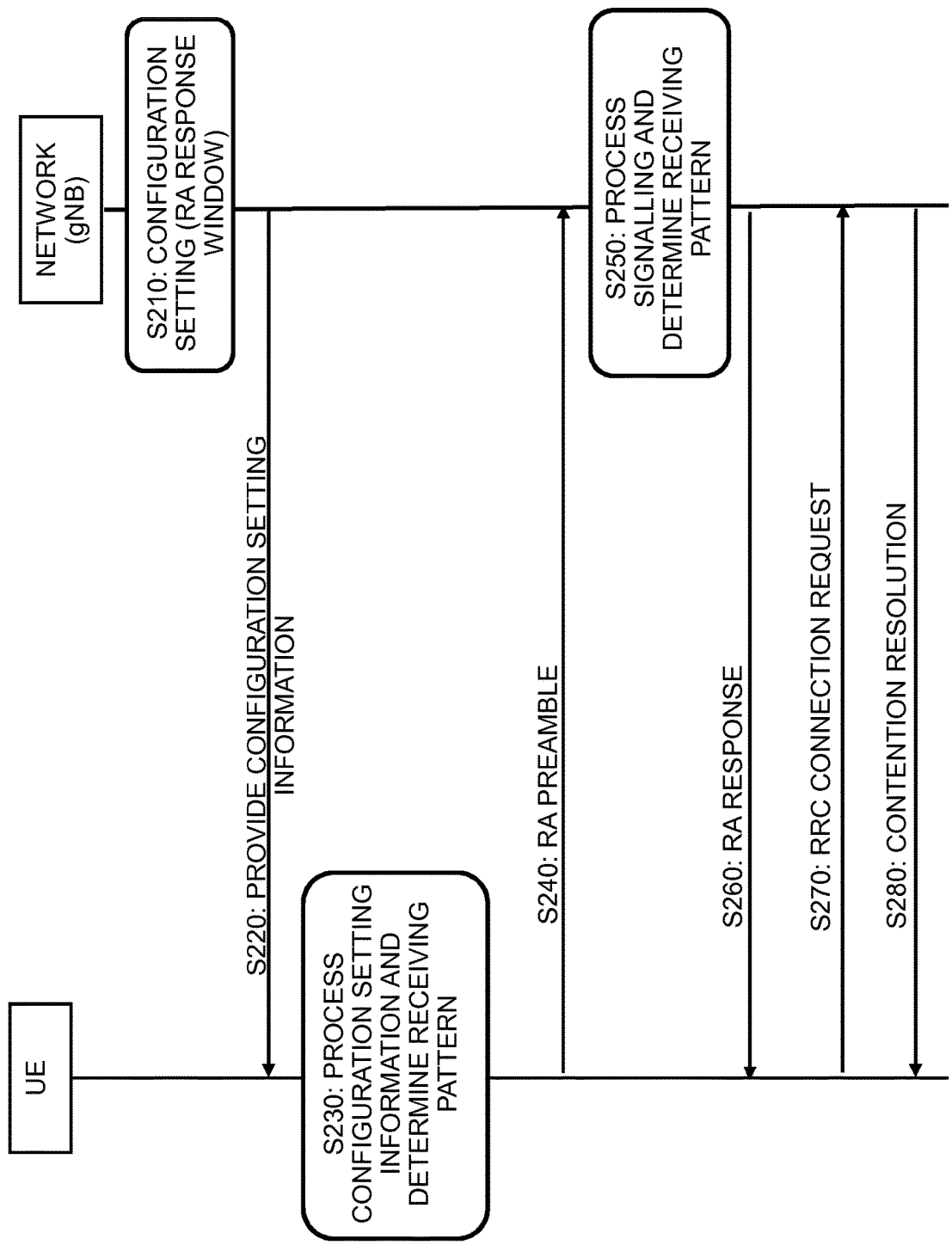
FIG. 2 shows a signaling diagram for explaining a random access control procedure according to examples of embodiments.

FIG. 2 shows a signaling diagram for explaining a random access control procedure according to examples of embodiments. In detail, the example in FIG. 2 is related to a case where, for example, the UE 10 communicates with a LEO satellite (element 20), wherein a contention based RACH procedure is conducted (e.g. for an initial attachment of the UE to the NW). Furthermore, in the example of FIG. 2, it is assumed that the difference between the minimum and maximum RTTs is 30 ms, so that the reception time window is set to be 30 ms.

First, as described above, the NW (i.e. satellite based gNB 20, referred to hereinafter as gNB 20) determines the reception time window for the RAresponse window, as described above, to be 30 ms. This information is included with other RACH related data into configuration setting information in S210 and sent (e.g. broadcasted) to the respective cell so as to be receivable by UEs located in the cell in S220. The configuration setting information includes a direct or indirect indication related to the determination of the receiving pattern of the UE element or function. The indirect indication is e.g. provided by the fact that the reception time window has a duration being greater than usual (e.g. plural time of the usual radio frame size). The direct indication is provided, for example by using a specific command to determine such a receiving pattern, or by including a set of data defining the form of the receiving pattern.

In the present example, it is assumed that the configuration setting information does not include further data related to the receiving pattern (i.e. the receiving pattern is determined on the UE side).

In S230, the UE 10 receives and processes the configuration setting information and the reception time window indication. On this basis, the receiving pattern is determined, e.g. by determining an interval size for time slots to be listened in the RAresponsewindow.

In S240, the UE 10 sends the RA preamble, with a calculated RA-RNTI, according to the RACH configuration, and starts the RAresponsewindow according to the reception time window indication (i.e. with or without an offset, and the like). On the basis of the SFN in which the RA preamble is sent in S240, the UE can determine, on the basis of the receiving pattern determined by using the reception time window length, in which slots of the reception time window a response (RAR) is to be expected. Hence, only in the specified time slots, the PDCCH is decoded.

When the gNB 20 receives the RA preamble and processes it. That is, on the basis of the SFN in which the RA preamble is sent in S240, and using the reception time window size calculated for the cell from which the RA preamble is received (i.e. in which the UE 10 is located), the corresponding receiving pattern including the time slots in which the UE 10 (identified by the RA-RNTI) is listening to the RAR.

On the basis of this information, the gNB 20 sends the RAR in S260 in such a manner that the RAR is received by the UE 10 in the correct time slot.

In S270, the UE sends an RRC connection request (i.e. Msg3) to the gNB 20, which responds to this signaling in S280 for contention resolution, as described above. Thus, the UE 10 is successfully connected to the gNB 20.

Figure 3:
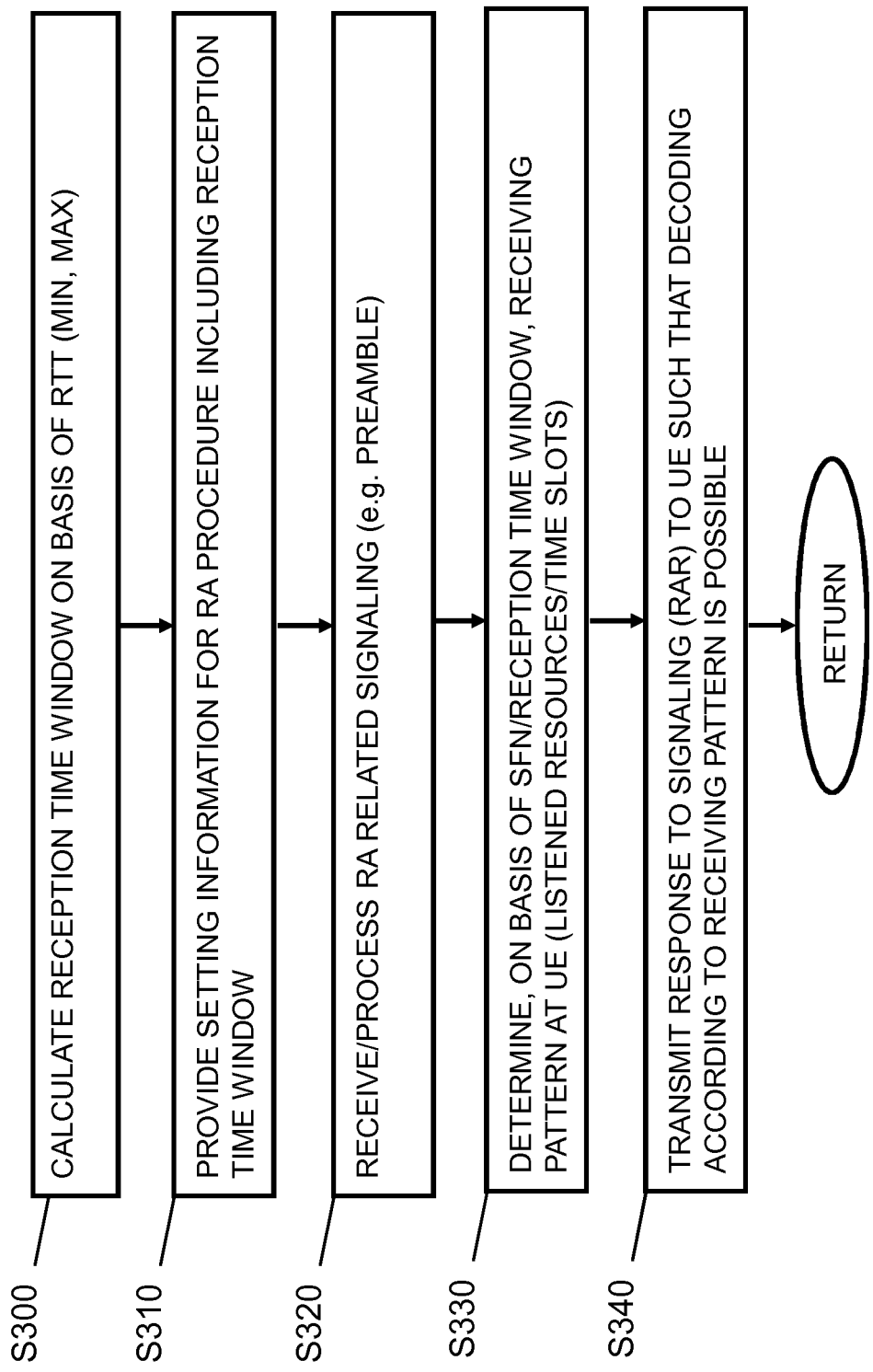
FIG. 3 shows a flow chart of a processing executed by a communication network control element or function according to some examples of embodiments.

FIG. 3 shows a flow chart of a processing executed by a communication network control element or function according to some examples of embodiments, which conducts a random access control for a communication with at least one communication element or function (UE) in a communication network. According to some examples of embodiments, the communication network is network where an extended RTT are possible, such as a NTN, wherein the communication network control element or functions acts as a BS, gNB etc. in the non-terrestrial network.

In S300, a reception time window in a RA procedure for a communication element or function in at least one communication area controlled by the communication network control element or function is calculated. As discussed in connection with FIG. 1, the reception time window considers the RTT to be expected for a communication in the respective cell or the like of the communication network such as the NTN. That is, for each coverage area, e.g. a cell, being controlled by the communication network control element or function, a respective reception time window can be determined.

According to some examples of embodiments, the reception time window is calculated on the basis of a minimum RTT and a maximum RTT of a signaling of a communication on a communication path between the at least one communication element or function (located in the corresponding cell) and the communication network control element or function in the at least one communication area controlled by the communication network control element or function. The reception time window considers the difference between the maximum RTT and the minimum RTT, wherein length of the reception time window is even to or greater than the difference therebetween.

According to some examples of embodiments, when the communication network involves RTTs, the reception time window is larger than one transmission frame (e.g. a SFN) in which a temporary identifier for the random access procedure is calculated (for example, the radio frame in which the RA-RNTI is calculated, as explained above). For example, the reception time window is n times the length of a radio frame of e.g. 10 ms.

In S310, setting information related to a RA procedure is provided to a communication element or function in the at least one communication area (i.e. the communication area to which the calculated reception time window is related).

The setting information includes, besides information like RACH configuration information, also an indication of the calculated reception time window, and an indication related to a determination of a receiving pattern of the communication element or function in the reception time window. The receiving pattern indicates communication resources being listened by the communication element or function during the reception time window for receiving a response to the random access related signaling. For example, the indication related to the determination of the receiving pattern of the communication element or function may be provided by an indirect indication, e.g. the fact that the reception time window has a duration being greater than usual (e.g. plural time of the usual radio frame size); alternatively the indication related to the determination of the receiving pattern of the communication element or function may be a direct indication, e.g. a specific command to determine such a receiving pattern, or a set of data defining the form of the receiving pattern.

According to some examples of embodiments, it is possible to provide, with the setting information related to the random access procedure and the indication of the reception time window, an indication defining a time offset between a point of time when the random access related signaling is sent from the communication element or function to a start of the reception time window (e.g. in case the minimum RTT has a length where it is advantageous to delay the start of the listening for the RAR accordingly).

In S320, a RA related signaling is received from the communication element or function, and processed. According to some examples of embodiments, the RA related signaling from the communication element or function is e.g. one of a RA preamble and a RRC connection request. In case of the RA preamble, the reception time window sets the timing for the RA response window in the at least one communication element or function. Otherwise, in case of the RRC connection request, the reception time window sets the RA contention resolution timer in the at least one communication element or function.

In S330, on the basis of a transmission frame in which the RA related signaling is sent by the communication element or function, and on the basis of the calculated reception time window, the receiving pattern of the communication element or function in the reception time window is determined (also the above described indication related to the determination of the receiving pattern can be considered, in particular when a set of data defining the form is used).

According to some examples of embodiments, as the receiving pattern of the communication element or function in the reception time window, an interval between communication resources being listened by the communication element or function for receiving and decoding the response to the RA related signaling is determined. The receiving pattern includes, between communication resources being listened, also communication resources in which the communication element or function does not decode the response to the RA related signaling.

Moreover, according to some examples of embodiments, the interval between the communication resources being listened by the communication element or function for receiving and decoding the response to the RA related signaling is set in the receiving pattern on the basis of the length of the reception time window (i.e. the longer the reception time window, the longer the interval (i.e. the greater the amount of resources being not listened by the communication element or function).

In addition, according to some examples of embodiments, the transmission frame on the basis of which the receiving pattern is characterized (i.e. which resources are actually listened, for example) is identified by using a system frame number. Hence, a location of communication resources being listened by the communication element or function according to the receiving pattern is determined on the basis of the system frame number in which the random access related signaling is transmitted by the communication element or function.

According to some examples of embodiments, the communication resources of the receiving pattern define one of time slots and frequency portions.

Furthermore, according to some examples of embodiments, it is possible that the receiving pattern or at least a basis thereof (e.g. an indication of the interval between resources to be listened) is provided by the network (e.g. the communication network control element or function) together with the setting information related to the RA procedure. That is, besides the indication of the reception time window, also data indicating a setting of the receiving pattern of the communication element or function are provided by the network. In this case, the determination of the receiving pattern to be used and considered on the network side is concentrated on the determination of the resources (time slot, frequency portions) being listened by the communication element or function (which is set according to the transmission frame) while the interval and the like are the same as that being provided with the setting information.

In S340, the response to the RA related signaling is sent to the communication element or function on the basis of the determined receiving pattern so that the response is received in a communication resource listened by the communication element or function.

Figure 4:
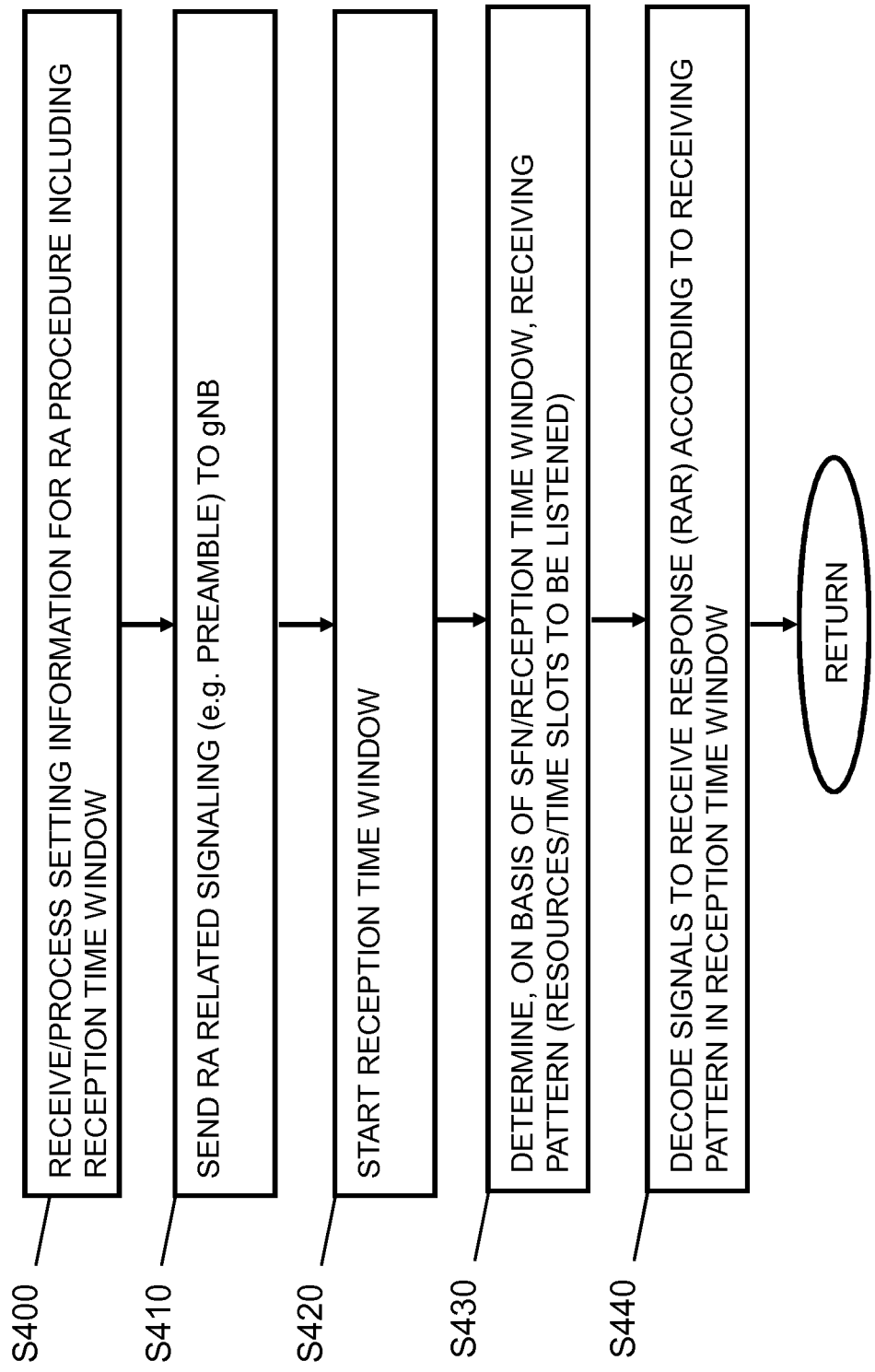
FIG. 4 shows a flow chart of a processing executed by a communication element or function such as a UE according to some examples of embodiments.

FIG. 4 shows a flow chart of a processing executed by a communication element or function according to some examples of embodiments, which conducts a random access control for a communication in a communication network. According to some examples of embodiments, the communication network is network where an extended RTT are possible, such as a NTN, wherein the communication is conducted with a communication network control element or functions acting as a BS, gNB etc. in the non-terrestrial network.

In S400, setting information related to a random access procedure is received from a communication network control element or function and processed. The setting information includes, besides information like RACH configuration information, also an indication of a reception time window in the random access procedure, and an indication related to a determination of a receiving pattern of the communication element or function in the reception time window. The receiving pattern indicates communication resources to be listened during the reception time window for receiving a response to the random access related signaling. For example, the indication related to the determination of the receiving pattern may be provided by an indirect indication, e.g. the fact that the reception time window has a duration being greater than usual (e.g. plural time of the usual radio frame size); alternatively the indication related to the determination of the receiving pattern of the communication element or function may be a direct indication, e.g. a specific command to determine such a receiving pattern, or a set of data defining the form of the receiving pattern.

As discussed in connection with FIG. 1, the reception time window considers the RTT to be expected for a communication in the respective cell or the like of the communication network such as the NTN. That is, for each coverage area, e.g. a cell, being controlled by the communication network control element or function, a respective reception time window can be determined.

According to some examples of embodiments, the reception time window is based on a minimum RTT and a maximum RTT of a signaling of a communication on a communication path between the communication element or function (located in the corresponding cell) and the communication network control element or function controlling the communication area. The reception time window considers the difference between the maximum RTT and the minimum RTT, wherein length of the reception time window is even to or greater than the difference therebetween.

According to some examples of embodiments, when the communication network involves RTTs, the reception time window is larger than one transmission frame (e.g. a SFN) in which a temporary identifier for the random access procedure is calculated (for example, the radio frame in which the RA-RNTI is calculated, as explained above). For example, the reception time window is n times the length of a radio frame of e.g. 10 ms.

According to some examples of embodiments, with the setting information related to the random access procedure, an indication defining a time offset between a point of time when the random access related signaling is sent to a start of the reception time window is received and processed (e.g. in case the minimum RTT has a length where it is advantageous to delay the start of the listening for the RAR accordingly). The time offset is considered before starting the reception time window after sending the random access related signaling.

In addition, according to some examples of embodiments, with the setting information related to the random access procedure, data indicating a setting of a receiving pattern are received and processed. The receiving pattern is then determined on the basis of the received data.

Next, in S410, a RA related signaling is sent to the communication network control element or function. According to some examples of embodiments, According to some examples of embodiments, the RA related signaling is e.g. one of a RA preamble and a RRC connection request. In case of the RA preamble, the reception time window sets the timing for the RA response window in the at least one communication element or function. Otherwise, in case of the RRC connection request, the reception time window sets the RA contention resolution timer in the at least one communication element or function.

In S420, after the sending of the RA related signaling, the reception time window according to the setting information is started. According to some examples of embodiments, in case a time offset is defined, the start of the reception time window is delayed accordingly.

In S430, on the basis of a transmission frame in which the RA related signaling is sent in S410, and on the basis of the received reception time window, the receiving pattern in the reception time window is determined, wherein the indication related to the determination of the receiving pattern of the communication element or function in the reception time window (direct or indirect indication) is used.

According to some examples of embodiments, as the receiving pattern of the communication element or function in the reception time window, an interval between communication resources to be listened for receiving and decoding the response to the RA related signaling is determined. The receiving pattern includes, between communication resources being listened, also communication resources in which the communication element or function does not decode the response to the RA related signaling.

Moreover, according to some examples of embodiments, the interval between the communication resources to be listened for receiving and decoding the response to the RA related signaling is set in the receiving pattern on the basis of the length of the reception time window (i.e. the longer the reception time window, the longer the interval (i.e. the greater the amount of resources being not listened by the communication element or function)).

In addition, according to some examples of embodiments, the transmission frame on the basis of which the receiving pattern is characterized (i.e. which resources are actually listened, for example) is identified by using a system frame number. Hence, a location of communication resources being listened by the communication element or function according to the receiving pattern is determined on the basis of the system frame number in which the random access related signaling is transmitted in S410.

According to some examples of embodiments, the communication resources of the receiving pattern define one of time slots and frequency portions.

In S440, during the reception time window and in accordance with the receiving pattern, signals received in the communication resources determined in the receiving pattern are decoded for receiving the response to the RA related signaling.

Figure 5:
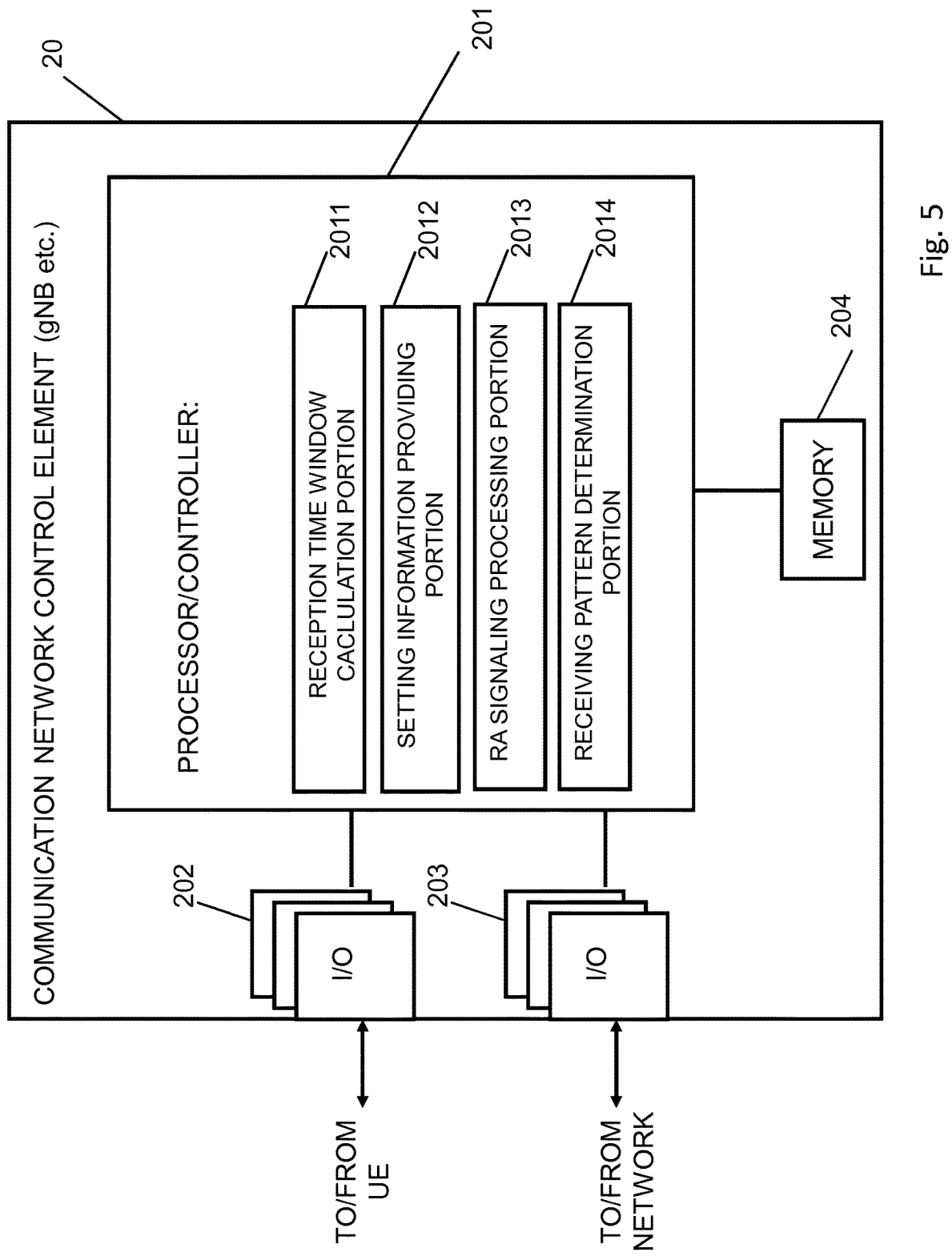
FIG. 5 shows a diagram of a network element or function representing a communication network control element or function according to some examples of embodiments.

FIG. 5 shows a diagram of a network element or function representing a communication network control element or function according to some examples of embodiments, e.g. a BS or gNB in element 20 or 40 of FIG. 1, which is configured to conduct a random access control procedure as described in connection with some of the examples of embodiments. It is to be noted that the communication network control element or function, like the gNB 20 of FIG. 1, may include further elements or functions besides those described herein below. Furthermore, even though reference is made to a communication network control element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication network control element or function shown in FIG. 5 may include a processing circuitry, a processing function, a control unit or a processor 201, such as a CPU or the like, which is suitable for executing instructions given by programs or the like related to the paging control procedure. The processor 201 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 202 and 203 denote input/output (I/O) units or functions (interfaces) connected to the processor or processing function 201. The I/O units 202 may be used for communicating with a communication element or function like the UE 10, as described in connection with FIG. 1, for example. The I/O units 203 may be used for communicating with other network element, like a gateway or a data network, as described in connection with FIG. 1. The I/O units 202 and 203 may be a combined unit including communication equipment towards several entities, or may include a distributed structure with a plurality of different interfaces for different entities. Reference sign 204 denotes a memory usable, for example, for storing data and programs to be executed by the processor or processing function 201 and/or as a working storage of the processor or processing function 201. It is to be noted that the memory 204 may be implemented by using one or more memory portions of the same or different type of memory.

The processor or processing function 201 is configured to execute processing related to the above described RA control processing. In particular, the processor or processing circuitry or function 201 includes one or more of the following sub-portions. Sub-portion 2011 is a processing portion which is usable as a portion for calculating a reception time window. The portion 2011 may be configured to perform processing according to S300 of FIG. 3. Furthermore, the processor or processing circuitry or function 201 may include a sub-portion 2012 usable as a portion for conducting a processing for providing setting information. The portion 2012 may be configured to perform a processing according to S310 of FIG. 3. In addition, the processor or processing circuitry or function 201 may include a sub-portion 2013 usable as a portion for processing an RA signaling. The portion 2013 may be configured to perform a processing according to S320 and S340 of FIG. 3. Moreover, the processor or processing circuitry or function 201 may include a sub-portion 2014 usable as a portion for determining a receiving pattern. The portion 2014 may be configured to perform a processing according to S340 of FIG. 3.

Figure 6:
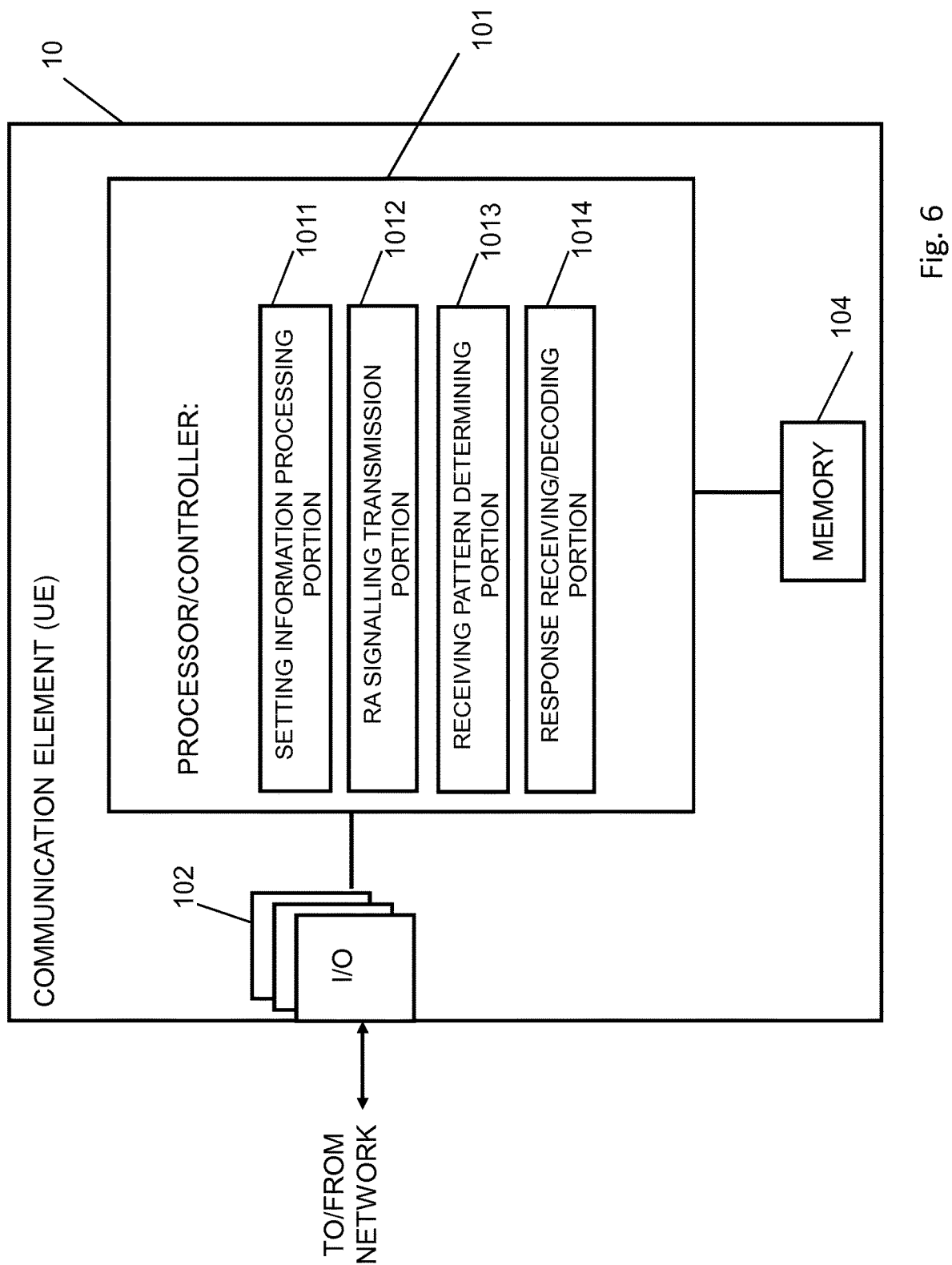
FIG. 6 shows a diagram of a network element or function representing a communication element or function according to some examples of embodiments.

FIG. 6 shows a diagram of a network element or function representing a communication element or function according to some examples of embodiments, e.g. a UE 10 of FIG. 1, which is configured to conduct a random access control procedure as described in connection with some of the examples of embodiments. It is to be noted that the communication element or function, like the UE 10 of FIG. 1, may include further elements or functions besides those described herein below. Furthermore, even though reference is made to a communication element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication element or function shown in FIG. 6 may include a processing circuitry, a processing function, a control unit or a processor 101, such as a CPU or the like, which is suitable for executing instructions given by programs or the like related to the paging control procedure. The processor 101 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 102 denotes input/output (I/O) units or functions (interfaces) connected to the processor or processing function 101. The I/O units 102 may be used for communicating with a communication network control element or function like the gNB 20, as described in connection with FIG. 1, for example. The I/O units 102 may be a combined unit including communication equipment towards several entities, or may include a distributed structure with a plurality of different interfaces for different entities. Reference sign 104 denotes a memory usable, for example, for storing data and programs to be executed by the processor or processing function 101 and/or as a working storage of the processor or processing function 101. It is to be noted that the memory 104 may be implemented by using one or more memory portions of the same or different type of memory.

The processor or processing function 101 is configured to execute processing related to the above described RA control processing. In particular, the processor or processing circuitry or function 101 includes one or more of the following sub-portions. Sub-portion 1011 is a processing portion which is usable as a portion for processing setting information. The portion 1011 may be configured to perform processing according to S400 of FIG. 4. Furthermore, the processor or processing circuitry or function 101 may include a sub-portion 1012 usable as a portion for transmitting an RA related signaling. The portion 1012 may be configured to perform a processing according to S410 and S420 of FIG. 4. In addition, the processor or processing circuitry or function 101 may include a sub-portion 1013 usable as a portion for determining a receiving pattern. The portion 1013 may be configured to perform a processing according to S430 of FIG. 4. Moreover, the processor or processing circuitry or function 101 may include a sub-portion 1014 usable as a portion for receiving and decoding a response. The portion 1014 may be configured to perform a processing according to S440 of FIG. 4.

It is to be noted that examples of embodiments of the invention are applicable to various different network configurations. In other words, the examples shown in the above described figures, which are used as a basis for the above discussed examples, are only illustrative and do not limit the present invention in any way. That is, additional further existing and proposed new functionalities available in a corresponding operating environment may be used in connection with examples of embodiments of the invention based on the principles defined.

As described above, an improved RA procedure is described which allows to use a reception time window for a response to an RA related signaling in a network environment where large and varying RTTs are to be considered, such as in an NTN configuration where different satellite scenarios are possible, wherein a waste of system resources and drain of the UE battery is avoided.

Specifically, according to examples of embodiments, it is possible that the RA-RNTI space can be kept without the need to be increased due to increasing the ra-ResponseWindow size to cope with the difference between minimum and maximum RTT of a satellite cell, for example. Furthermore, the UE power consumption can be limited since despite a longer reception time window (e.g. ra-Response Window size) the amount of time the UE has to decode the PDCCH is similar to the amount of time required with legacy window sizes.

The described control procedure is flexible since it can be applied to different NTN scenarios, both LEO and GEO, and both transparent and regenerative satellite solutions. Moreover, in case of a bent-pipe case, delay variations on both feeder (ground station to satellite) and service link (satellite to UE terminal) can be handled easier with the above discussed mechanism.

Furthermore, the above described control procedure can be further adapted to the actual communication conditions. For example, when the location and/or movement of the UE 10 is predictable (e.g. stationary w.r.t to Earth, or an airplane moving along a pre-determined trajectory), the receiving pattern (e.g. a time domain pattern) can be further adapted 'on-the-go' to maximize PRACH capacity. Regarding the location, in case the cell being used by the UE is located e.g. in an area where only a limited number of UEs is to be expected (e.g. in an ocean region with low traffic density of planes or ships), the receiving pattern can be adapted accordingly. In addition, the proposed RA procedure and the receiving pattern used therein can be adapted to a configuration where multiple beams (e.g. several 5G NR beams) are generated by the satellite or UAS platform.

According to a further example of embodiments, there is provided, for example, an apparatus for use by a communication network control element or function configured to conduct a communication control for a communication with at least one communication element or function in a communication network, the apparatus comprising means configured to calculate a reception time window in a random access procedure for a communication element or function in at least one communication area controlled by the communication network control element or function, means configured to provide setting information related to a random access procedure to a communication element or function in the at least one communication area, the setting information including an indication of the calculated reception time window and an indication related to a determination of a receiving pattern of the communication element or function in the reception time window, wherein the receiving pattern indicates communication resources being listened by the communication element or function during the reception time window for receiving a response to the random access related signaling, means configured to receive and process a random access related signaling from the communication element or function, means configured to determine, on the basis of a transmission frame in which the random access related signaling is sent by the communication element or function and the calculated reception time window, the receiving pattern of the communication element or function in the reception time window, means configured to transmit, to the communication element or function, the response to the random access related signaling on the basis of the determined receiving pattern so that the response is received in a communication resource listened by the communication element or function.

Furthermore, according to some other examples of embodiments, the above defined apparatus may further comprise means for conducting at least one of the processing defined in the above described methods, for example a method according to that described in connection with FIG. 3.

According to a further example of embodiments, there is provided, for example, an apparatus for use by a communication element or function configured to conduct a communication with a communication network control element or function controlling a communication in a communication network, the apparatus comprising means configured to receive and process setting information related to a random access procedure from the communication network control element or function, the setting information including an indication of a reception time window in the random access procedure and an indication related to a determination of a receiving pattern of the communication element or function in the reception time window, wherein the receiving pattern indicates communication resources being listened by the communication element or function during the reception time window for receiving a response to the random access related signaling, means configured to send a random access related signaling to the communication network control element or function, means configured to start the reception time window according to the setting information, means configured to determine, on the basis of a transmission frame in which the random access related signaling is sent and the reception time window, the receiving pattern in the reception time window, means configured to decode, during the reception time window, signals received in the communication resources determined in the receiving pattern for receiving the response to the random access related signaling.

Furthermore, according to some other examples of embodiments, the above defined apparatus may further comprise means for conducting at least one of the processing defined in the above described methods, for example a method according to that described in connection with FIG. 4.

According to a further example of embodiments, there is provided, for example, a non-transitory computer readable medium comprising program instructions for causing an apparatus to perform, when conducting a communication control for a communication with at least one communication element or function in a communication network, at least the following: calculating a reception time window in a random access procedure for a communication element or function in at least one communication area controlled by the communication network control element or function, providing setting information related to a random access procedure to a communication element or function in the at least one communication area, the setting information including an indication of the calculated reception time window and an indication related to a determination of a receiving pattern of the communication element or function in the reception time window, wherein the receiving pattern indicates communication resources to be listened during the reception time window for receiving a response to the random access related signaling, receiving and processing a random access related signaling from the communication element or function, determining, on the basis of a transmission frame in which the random access related signaling is sent by the communication element or function and the calculated reception time window, the receiving pattern of the communication element or function in the reception time window, transmitting, to the communication element or function, the response to the random access related signaling on the basis of the determined receiving pattern so that the response is received in a communication resource listened by the communication element or function.

According to a further example of embodiments, there is provided, for example, a non-transitory computer readable medium comprising program instructions for causing an apparatus to perform, when conducting a communication with at least one communication network control element or function in a communication network, at least the following: receiving and processing setting information related to a random access procedure from the communication network control element or function, the setting information including an indication of a reception time window in the random access procedure and an indication related to a determination of a receiving pattern of the communication element or function in the reception time window, wherein the receiving pattern indicates communication resources being to be listened during the reception time window for receiving a response to the random access related signaling, sending a random access related signaling to the communication network control element or function, starting the reception time window according to the setting information, determining, on the basis of a transmission frame in which the random access related signaling is sent and the reception time window, the receiving pattern in the reception time window, decoding, during the reception time window, signals received in the communication resources determined in the receiving pattern for receiving the response to the random access related signaling.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus for use by a communication network control element configured to conduct a communication control for a communication with at least one communication element in a communication network, the apparatus comprising
at least one processing circuitry, and
at least one memory for storing instructions to be executed by the processing circuitry,
wherein the at least one memory and the instructions are configured to, with the at least one processing circuitry, cause the apparatus at least:
to calculate a reception time window in a random access procedure for a communication element in at least one communication area controlled by the communication network control element,
to provide setting information related to the random access procedure to the communication element in the at least one communication area, the setting information including an indication of the reception time window and an indication related to a determination of a receiving pattern of the communication element in the reception time window, wherein the receiving pattern indicates communication resources being listened by the communication element during the reception time window for receiving a response to a random access related signaling,
to receive and process the random access related signaling from the communication element,
to determine, on the basis of a transmission frame in which the random access related signaling is sent by the communication element and the reception time window, the receiving pattern of the communication element in the reception time window,
to transmit, to the communication element, the response to the random access related signaling on the basis of the receiving pattern so that the response is received in a communication resource listened by the communication element,
wherein the at least one memory and the instructions are further configured to, with the at least one processing circuitry, cause the apparatus at least:
to determine, as the receiving pattern of the communication element in the reception time window, an interval between communication resources being listened by the communication element for receiving and decoding the response to the random access related signaling, wherein the receiving pattern includes between communication resources being listened communication resources in which the communication element does not decode the response to the random access related signaling;
to set the interval between the communication resources being listened by the communication element for receiving and decoding the response to the random access related signaling on the basis of the length of the reception time window,
wherein the transmission frame is identified by using a system frame number, wherein a location of communication resources being listened according to the receiving pattern is determined on the basis of the system frame number in which the random access related signaling is sent.

2. The apparatus according to claim 1, wherein the at least one memory and the instructions are further configured to, with the at least one processing circuitry, cause the apparatus at least:
to calculate the reception time window on the basis of a minimum round trip time and a maximum round trip time of a signaling of a communication on a communication path between the at least one communication element and the communication network control element in the at least one communication area controlled by the communication network control element, wherein the reception time window is equal to or greater than a difference between the maximum round trip time and the minimum round trip time.

3. The apparatus according to claim 2, wherein the reception time window is larger than one transmission frame in which a temporary identifier for the random access procedure is calculated.

4. The apparatus according to claim 1, wherein the at least one memory and the instructions are further configured to, with the at least one processing circuitry, cause the apparatus at least:
to provide, with the setting information related to the random access procedure, an indication defining a time offset between a point of time when the random access related signaling is sent from the communication element to a start of the reception time window.

5. The apparatus according to claim 1, wherein communication resources of the receiving pattern define one of time slots and frequency portions.

6. The apparatus according to claim 5, wherein the receiving pattern is configured to define a beam-hopping pattern and a sequence pattern.

7. An apparatus for use by a communication element configured to conduct a communication with a communication network control element controlling a communication in a communication network, the apparatus comprising:
at least one processing circuitry, and
at least one memory for storing instructions to be executed by the processing circuitry,
wherein the at least one memory and the instructions are configured to, with the at least one processing circuitry, cause the apparatus at least:
to receive and process setting information related to a random access procedure from the communication network control element, the setting information including an indication of a reception time window in the random access procedure and an indication related to a determination of a receiving pattern of the communication element in the reception time window, wherein the receiving pattern indicates communication resources being listened by the communication element during the reception time window for receiving a response to a random access related signaling,
to send the random access related signaling to the communication network control element,
to start the reception time window according to the setting information,
to determine, on the basis of a transmission frame in which the random access related signaling is sent and the reception time window, the receiving pattern in the reception time window,
to decode, during the reception time window, signals received in the communication resources determined in the receiving pattern for receiving the response to the random access related signaling, wherein the at least one memory and the instructions are further configured to, with the at least one processing circuitry, cause the apparatus at least:
to determine, as the receiving pattern of the communication element in the reception time window, an interval between communication resources being listened for receiving and decoding the response to the random access related signaling, wherein the receiving pattern includes between communication resources being listened communication resources in which the response to the random access related signaling is not decoded;
to set the interval between the communication resources being listened by the communication element for receiving and decoding the response to the random access related signaling on the basis of the length of the reception time window,
wherein the transmission frame is identified by using a system frame number, wherein a location of communication resources being listened according to the receiving pattern is determined on the basis of the system frame number in which the random access related signaling is sent.

8. The apparatus according to claim 7, wherein the reception time window is based on a minimum round trip time and a maximum round trip time of a signaling of a communication on a communication path between the communication element and the communication network control element, wherein the reception time window is equal to or greater than a difference between the maximum round trip time and the minimum round trip time.

9. The apparatus according to claim 8, wherein the reception time window is larger than one transmission frame in which a temporary identifier for the random access procedure is calculated.

10. The apparatus according to claim 7, wherein the at least one memory and the instructions are further configured to, with the at least one processing circuitry, cause the apparatus at least:
to receive and process, with the setting information related to the random access procedure, an indication defining a time offset between a point of time when the random access related signaling is sent to the start of the reception time window, and
to consider the time offset before starting the reception time window after sending the random access related signaling.

11. The apparatus according to claim 7, wherein communication resources of the receiving pattern define one of time slots and frequency portions.

12. The apparatus according to claim 11, wherein the receiving pattern is configured to define a beam-hopping pattern and a sequence pattern.

13. A method for use in a communication element configured to conduct a communication with a communication network control element controlling a communication in a communication network, the method comprising:
receiving and processing setting information related to a random access procedure from the communication network control element, the setting information including an indication of a reception time window in the random access procedure and an indication related to a determination of a receiving pattern of the communication element in the reception time window, wherein the receiving pattern indicates communication resources being to be listened during the reception time window for receiving a response to a random access related signaling,
sending the random access related signaling to the communication network control element,
starting the reception time window according to the setting information,
determining, on the basis of a transmission frame in which the random access related signaling is sent and the reception time window, the receiving pattern in the reception time window,
decoding, during the reception time window, signals received in the communication resources determined in the receiving pattern for receiving the response to the random access related signaling,
the method further comprising:
determining, as the receiving pattern of the communication element in the reception time window, an interval between communication resources being listened for receiving and decoding the response to the random access related signaling, wherein the receiving pattern includes between communication resources being listened communication resources in which the response to the random access related signaling is not decoded,
setting the interval between the communication resources being listened by the communication element for receiving and decoding the response to the random access related signaling on the basis of the length of the reception time window,
wherein the transmission frame is identified by using a system frame number, wherein a location of communication resources being listened according to the receiving pattern is determined on the basis of the system frame number in which the random access related signaling is sent.

14. The method according to claim 13, wherein the reception time window is based on a minimum round trip time and a maximum round trip time of a signaling of a communication on a communication path between the communication element and the communication network control element, wherein the reception time window is equal to or greater than a difference between the maximum round trip time and the minimum round trip time.

15. The method according to claim 14, wherein the reception time window is larger than one transmission frame in which a temporary identifier for the random access procedure is calculated.

16. The method according to claim 13, further comprising:
receiving and processing, with the setting information related to the random access procedure, an indication defining a time offset between a point of time when the random access related signaling is sent to the start of the reception time window, and
considering the time offset before starting the reception time window after sending the random access related signaling.

17. The method according to claim 13, wherein communication resources of the receiving pattern define one of time slots and frequency portions.

18. The method according to claim 17, wherein the receiving pattern is configured to define a beam-hopping pattern and a sequence pattern.

* * * * *